US011968354B2

(12) United States Patent
Jun et al.

(10) Patent No.: US 11,968,354 B2

(45) Date of Patent: Apr. 23, 2024

(54) AUTOMATIC EVALUATING APPARATUS FOR BUILT-IN VIDEO RECORDING DEVICE OF VEHICLE, SYSTEM HAVING THE SAME, AND METHOD THEREOF

(71) Applicants: Hyundai Motor Company, Seoul (KR); Kia Corporation, Seoul (KR)

(72) Inventors: Sung Hwan Jun, Gyeonggi-do (KR); Kyoung Jun Kim, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/464,507

(22) Filed: Sep. 1, 2021

(65) Prior Publication Data

US 2022/0329779 A1 Oct. 13, 2022

(30) Foreign Application Priority Data

Apr. 7, 2021 (KR) ........................ 10-2021-0045435

(51) Int. Cl.
*H04N 17/06* (2006.01)

(52) U.S. Cl.
CPC .................................. *H04N 17/06* (2013.01)

(58) Field of Classification Search
CPC ...... H04N 17/06; G07C 5/0866; G06F 3/048; G06F 3/0416; B60W 50/02; B60W 50/14; B60W 2050/0005; B60W 2050/146; B60W 2420/403; B60K 35/00; B60K 35/10; B60K 35/22; B60K 35/28; B60K 2360/11; B60K 2360/176; B60Q 1/56; B60R 16/03
See application file for complete search history.

(56) References Cited

U.S. PATENT DOCUMENTS

| | | | | |
|---|---|---|---|---|
| 5,475,843 | A * | 12/1995 | Halviatti | G09B 19/0053 719/329 |
| 8,452,568 | B2 | 5/2013 | Imanishi et al. | |
| 10,841,571 | B2 | 11/2020 | Sigle | |
| 2017/0139812 | A1* | 5/2017 | Cai | G06F 8/38 |
| 2018/0332364 | A1* | 11/2018 | Sim | H04N 21/84 |
| 2019/0068963 | A1* | 2/2019 | Skudlarek | H04N 5/247 |
| 2020/0003835 | A1* | 1/2020 | Ahmad | G01R 31/003 |
| 2021/0287460 | A1* | 9/2021 | Aono | G07C 5/008 |

FOREIGN PATENT DOCUMENTS

| | | | |
|---|---|---|---|
| JP | 2005-77107 | A | 3/2005 |
| JP | 2006-53130 | A | 2/2006 |
| JP | 2007-261463 | A | 10/2007 |
| JP | 2010-175456 | A | 8/2010 |
| KR | 102037459 | B1 | 10/2019 |

* cited by examiner

*Primary Examiner* — Michael E Teitelbaum

(74) *Attorney, Agent, or Firm* — Fox Rothschild LLP

(57) ABSTRACT

An automatic evaluating apparatus of a build-in video recording device of a vehicle includes: a processor configured to automatically evaluate performance of the built-in video recording device of the vehicle interworking with a vehicle display device; and a storage configured to store data and algorithms driven by the processor.

18 Claims, 12 Drawing Sheets

AUTOMATIC EVALUATING APPARATUS FOR BUILT-IN VIDEO RECORDING DEVICE OF VEHICLE, SYSTEM HAVING THE SAME, AND METHOD THEREOF

CROSS-REFERENCE TO RELATED APPLICATION

This application claims under 35 U.S.C. § 119(a) the benefit of Korean Patent Application No. 10-2021-0045435 filed in the Korean Intellectual Property Office on Apr. 7, 2021, the entire contents of which are incorporated herein by reference.

BACKGROUND

(a) Technical Field

The present disclosure relates to an automatic evaluating apparatus of a built-in video recording device of a vehicle, an automatic evaluating system including the same, and a method thereof, more particularly, to a technique for automatically evaluating performance of the built-in video recording device.

(b) Description of the Related Art

A built-in cam system is provided as a built-in driving video recording device in order to record a driving or parking video of a vehicle. Such a built-in cam outputs video data in conjunction with an AVN display device within the vehicle.

Conventionally, there was no automatic evaluation technique for a built-in cam system for a vehicle, and manual verification was performed based on all actual vehicles.

That is, conventionally, an output terminal of an actual vehicle controller was measured for electrical performance measurement, camera recording performance was simply checked in an actual vehicle environment for recording function evaluation, and a screen was evaluated by manually touching an actual vehicle-based AVNT display for GUI performance evaluation. In addition, in the related art, it was difficult to verify visibility depending on a license plate distance, and it was impossible to verify an influence of illumination/screen complexity.

As such, there is a problem in that work efficiency is lowered by manually verifying video recording and an AVNT GUI display function of the built-in cam system in the prior art. In particular, there was an evaluation deviation for each test person because quantitative evaluation was impossible as all GUI touch verification was performed manually.

In addition, in the prior art, it was difficult to implement a verification environment for external environmental conditions (visibility by illumination/license plate distance) when checking the visibility of the license plate in the actual vehicle, so the evaluation of video quality and visibility of a camera recorded video of the video recording system was somewhat insufficient.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure provides an automatic evaluating apparatus for a built-in video recording device of a vehicle, an automatic evaluating system including the same, and a method thereof, capable of automatically verifying a function of the built-in video recording device without requiring use of an actual vehicle.

The technical objects of the present disclosure are not limited to the objects mentioned above, and other technical objects not mentioned can be clearly understood by those skilled in the art from the description of the claims.

An exemplary embodiment of the present disclosure provides an automatic evaluating apparatus including: a processor configured to automatically evaluate performance of a built-in video recording device of a vehicle interworking with a vehicle display device; and a storage configured to store data and algorithms driven by the processor.

In an exemplary embodiment, the processor may automatically evaluate at least one of GUI verification, basic performance verification, recording quality verification, electrical performance verification, abnormal mode verification, or communication performance verification of a video of the built-in video recording device.

In an exemplary embodiment, The basic performance verification may include at least one of booting time evaluation, front and rear time deviation evaluation, emergency download function evaluation, recorded file consistency evaluation, frame per second (FPS) performance evaluation, or mode evaluation before and after customer delivery.

In an exemplary embodiment, the processor may perform GUI evaluation by automatically touching a graphical user interface (GUI) screen of the vehicle display device that outputs a video of the built-in video recording device through robot arm control.

In an exemplary embodiment, the processor may generate virtual touch coordinate information and may transmit it to the built-in video recording device to automatically evaluate a GUI video that is transferred by the built-in video recording device.

In an exemplary embodiment, the processor may automatically determine suitability of a video that is transmitted by the built-in video recording device to the vehicle display device by branching the video.

In an exemplary embodiment, the processor may verify a booting time from a power-off state of the built-in video recording device to a point of time when a recording operation is possible when power is applied under at least one voltage condition.

In an exemplary embodiment, the at least one voltage condition may be set by a combination of parking recording setting, parking recording non-setting, and remote starting condition.

In an exemplary embodiment, the processor may automatically evaluate a deviation between a video of a front camera and a video of a rear camera for each of a plurality of recording modes.

In an exemplary embodiment, The recording modes may include at least one of a regular driving mode, a driving impact mode, a driving manual mode, a regular parking mode, a parking impact mode, or a parking manual recording mode.

In an exemplary embodiment, the processor may evaluate whether a video stored in the built-in video recording device is automatically downloaded, and determines suitability of an automatically generated log text file.

In an exemplary embodiment, the processor may verify suitability of a maximum capacity by extracting capacity information of a recorded video after performing recording at the maximum capacity for each of a plurality of recording modes.

In an exemplary embodiment, the processor may perform frame per second (FPS) verification by playing each recorded file after recording all videos for each of a plurality of recording modes in a full memory.

In an exemplary embodiment, The processor may output a license plate to the display panel to gradually reduce a size from an actual criterion size of the license plate, and may estimate a distance to an actual vehicle, to automatically verify license plate visibility for each estimated distance between the illuminance and the actual vehicle.

In an exemplary embodiment, the processor may automatically determine whether the built-in video recording device performs normal recording under an abnormal power condition in conjunction with the power supply.

In an exemplary embodiment, the processor may automatically extract a recorded file list and automatically determines whether the file is appropriate and whether a file capacity and a file name are appropriate based on meta data.

An exemplary embodiment of the present disclosure provides an automatic evaluating system including: an automatic evaluating apparatus configured to automatically evaluate performance of a built-in video recording device interworking with a vehicle display device; a front camera chamber configured to evaluate performance of a front camera of a vehicle; a rear camera chamber configured to evaluate performance of a rear camera; and a GUI evaluation chamber configured to evaluate a graphical user interface (GUI) screen of the built-in video recording device.

An exemplary embodiment of the present disclosure provides an automatic evaluating method including: selecting an item for performance evaluation of a built-in video recording device interworking with a vehicle display device; performing evaluation of the selected item; automatically determining a performance result of the evaluation; and automatically outputting a report based on the automatic determination result.

In an exemplary embodiment, the item for the performance evaluation may include at least one of GUI verification, basic performance verification, recording quality verification, electrical performance verification, abnormal mode verification, or communication performance verification of a video of the built-in video recording device.

In an exemplary embodiment, the basic performance verification may include at least one of booting time evaluation, front and rear time deviation evaluation, emergency download function evaluation, recorded file consistency evaluation, frame per second (FPS) performance evaluation, or mode evaluation before and after customer delivery.

According to the present technique, it is possible to automatically evaluate performance of a built-in video recording device without use of an actual vehicle, it is possible to verify performance according to external environmental conditions (visibility by illumination/license plate distance), and it is possible to perform accurate evaluation without evaluation deviation, thereby increasing reliability of the built-in video recording device.

In addition, various effects that can be directly or indirectly identified through this document may be provided.

DETAILED DESCRIPTION OF THE EMBODIMENTS

Figure 1:
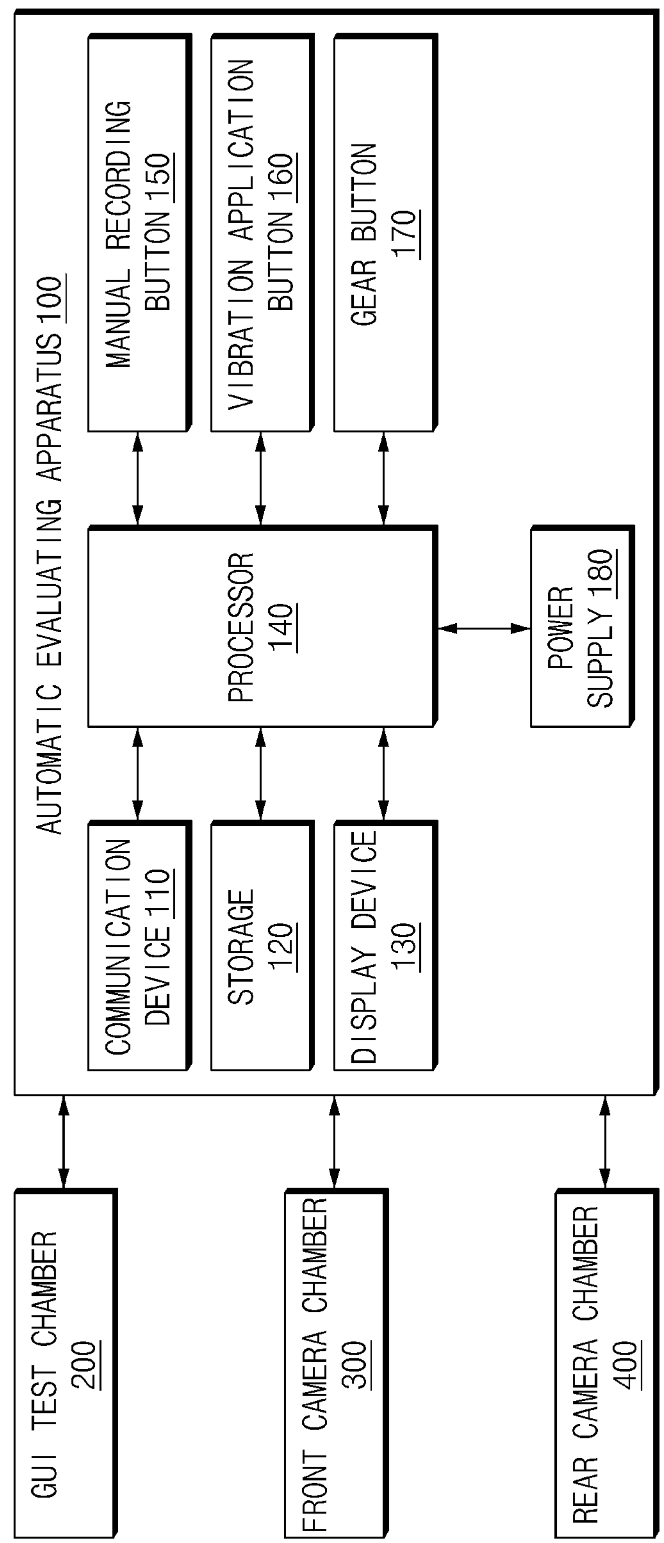
FIG. 1 illustrates a block diagram showing a configuration of an automatic evaluating system including an automatic evaluating apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 10.

Figure 2A:
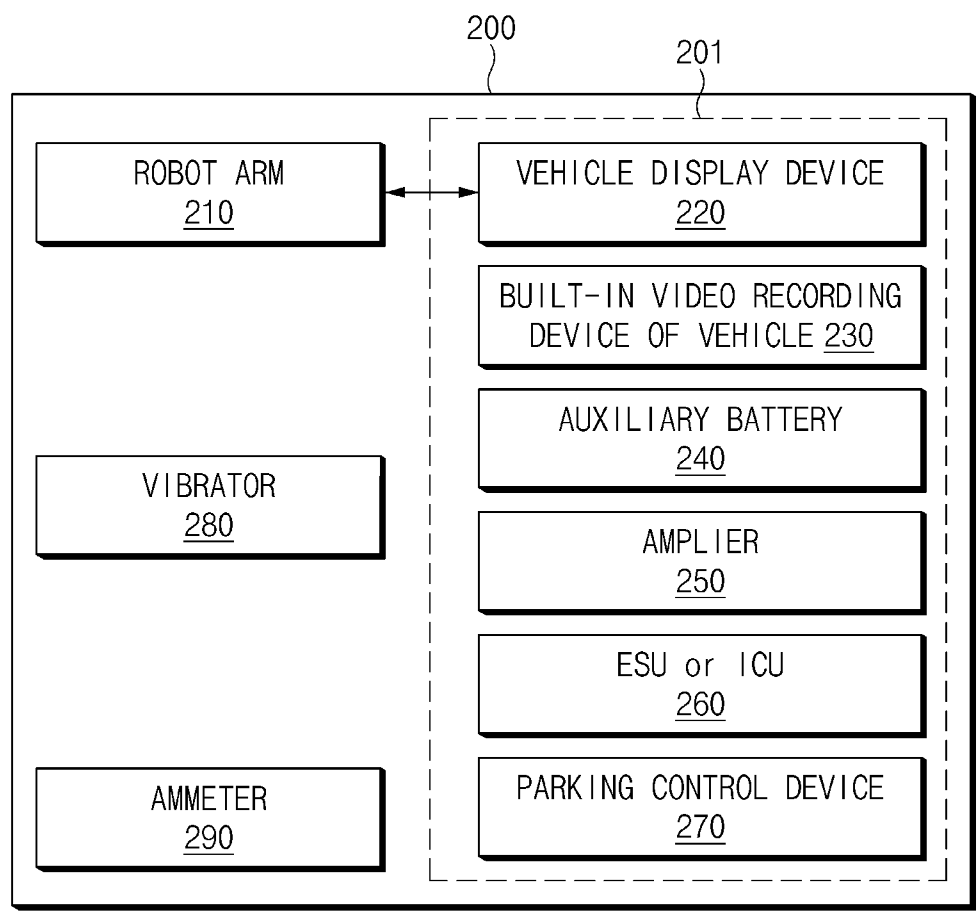
FIG. 2A and FIG. 2B illustrate examples of a chamber configuration for GUI evaluation according to an exemplary embodiment of the present disclosure.
Figure 2B:
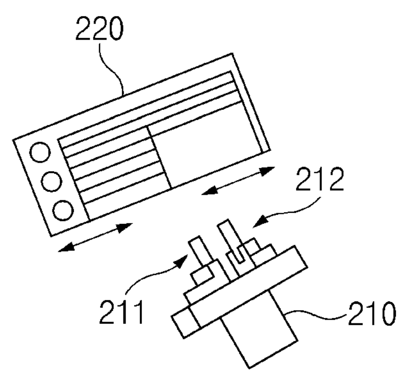
Figure 3A:
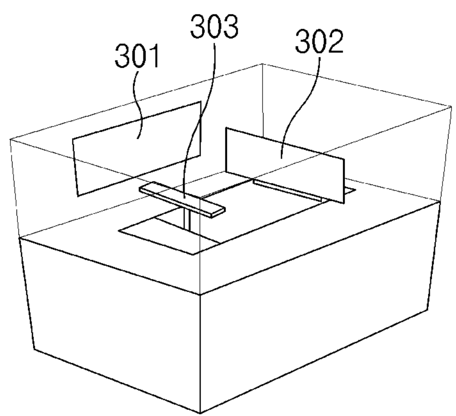
FIG. 3A and FIG. 3B illustrate examples of a chamber configuration for camera video evaluation according to an exemplary embodiment of the present disclosure.
Figure 3B:
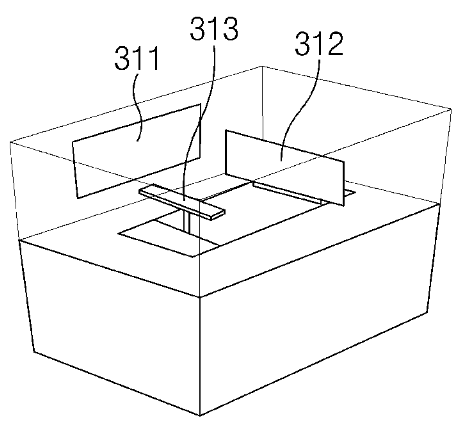
Figure 4A:
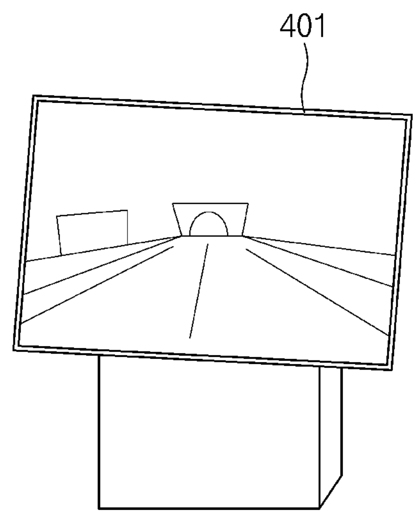
FIG. 4A and FIG. 4B illustrate examples of a control table configuration according to an exemplary embodiment of the present disclosure.
Figure 4B:
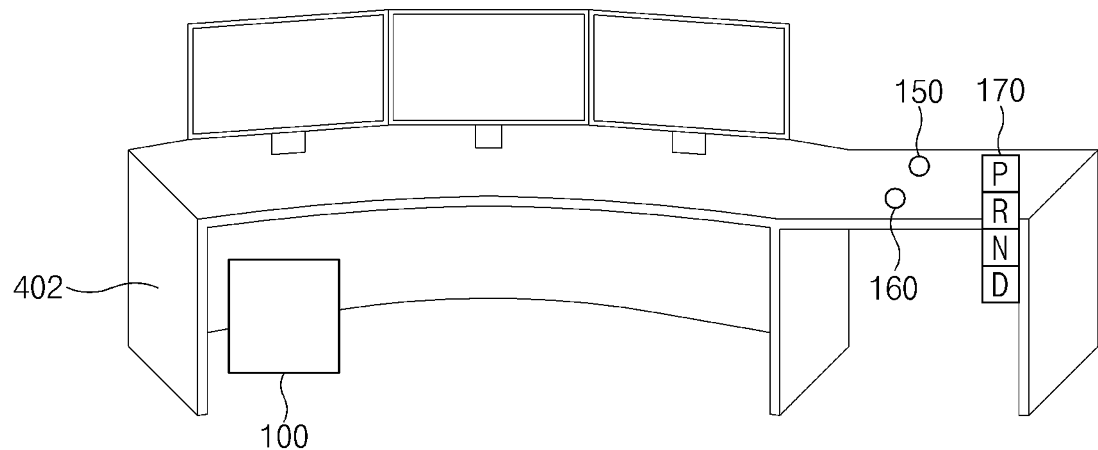

FIG. 1 illustrates a block diagram showing a configuration of an automatic evaluating system including an automatic evaluating apparatus according to an exemplary embodiment of the present disclosure. FIG. 2A and FIG. 2B illustrate examples of a chamber configuration for GUI evaluation according to an exemplary embodiment of the present disclosure, and FIG. 3A and FIG. 3B illustrate examples of a chamber configuration for camera video evaluation according to an exemplary embodiment of the present disclosure. FIG. 4A and FIG. 4B illustrate examples of a control table configuration according to an exemplary embodiment of the present disclosure.

Referring to FIG. 1, a vehicle system according to an exemplary embodiment of the present disclosure may include an automatic evaluating apparatus 100, a GUI evaluation chamber 200, a front camera chamber 300, and a rear camera chamber 400, etc.

The automatic evaluating apparatus 100 may automatically evaluate performance of a built-in video recording device interworking with a vehicle display device 220. The automatic evaluating apparatus 100 may perform evaluation by automating various test conditions that are difficult to check in an actual vehicle during evaluation of a conventional built-in cam so as to perform quantitative evaluation compared to the existing one, and particularly, more quantitative and efficient evaluation is possible by replacing a GUI touch evaluation part, which requires a lot of effort by an evaluator, with an automatic evaluation method applying a robot arm.

To this end, the automatic evaluating apparatus 100 according to an exemplary embodiment of the present disclosure may interwork with sample devices such as the vehicle display device 220, the front camera 303, the rear camera 313, an ESU or ICU 260, and a parking control device 270 implemented inside a vehicle so as to evaluate whether the in-vehicle video recording device (e.g., a built-in cam) is malfunctioning.

In this case, the built-in video recording device may include a drive video record system (DVRS), a built-in camera system, and the like, and may interwork with an audio video navigation (AVN) and a smartphone in the vehicle so as to perform front and rear high-definition recording, recording while parking (when an auxiliary battery is installed), impact detection, and the like.

Referring to FIG. 1, the automatic evaluating apparatus 100 includes a communication device 110, a storage 120, a display device 130, a processor 140, a manual recording button 150, a vibration application button 160, a gear button 170, and a power supply 180.

The communication device 110, which is a hardware device implemented with various electronic circuits to transmit and receive signals through a wireless or wired connection, may communicate with the GUI evaluation chamber 200, the front camera chamber 300, and the rear camera chamber 400, etc. Particularly, the communication device 110 may communicate with the sample devices such as the vehicle display device 220, the front camera 303, the rear camera 313, the ESU or ICU 260, and the parking control device 270.

The communication device 110 may perform low voltage differential signaling (LVDS) communication or Ethernet communication, and may implement an in-vehicle network communication technique. As an example, the in-vehicle network communication techniques may include controller area network (CAN) communication, local interconnect network (LIN) communication, flex-ray communication, and the like.

The storage 120 may store data and/or algorithms required for the processor 140 to operate, and the like. In particular, the storage 120 may store a learning algorithm for learning the determination criteria in advance for automatic evaluation. As an example, the storage 120 may store pre-learned determination criteria for automatic evaluation.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include an input means for receiving a control command from a user and an output means for outputting an operation state of the apparatus 100 and results thereof. Herein, the input means may include a key button, and may further include a keyboard, a mouse, a joystick, a jog shuttle, a stylus pen, and the like. In addition, the input means may further include a soft key implemented on the display.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated. In an exemplary embodiment of the present disclosure, the output means may output a screen indicating an automatic evaluation result of the built-in video recording device. In this case, the output means may be implemented as a monitor of FIG. 4B.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the storage 120, the display device 130, the manual record button 150, the vibration application button 160, the gear button 170, and the power supply 180, etc., may electrically control each component, and may be an electrical circuit that executes software commands, thereby performing various data processing and calculations described below.

The processor 140 may process a signal transferred between components of the automatic evaluating apparatus 100, and may perform overall control such that each of the components can perform its function normally.

The processor 140 may be implemented in the form of hardware, software, or a combination of hardware and software, or may be implemented as microprocessor.

The processor 140 may automatically evaluate the performance of the built-in video recording device (e.g., a built-in cam) that interworks with a vehicle display device (e.g., an AVNT).

The processor 140 may automatically evaluate at least one of GUI verification, basic performance verification, recording quality verification, electrical performance verification, abnormal mode verification, or communication performance verification of a video of the built-in video recording device. The basic performance verification may include at least one of booting time evaluation, front and rear time deviation evaluation, emergency download function evaluation, recorded file consistency evaluation, frame per second (FPS) performance evaluation, or mode evaluation before and after customer delivery. These performance verification items will be described in more detail later with reference to FIG. 5A and FIG. 5B.

The processor 140 may perform GUI evaluation by automatically touching a graphical user interface (GUI) screen of a vehicle display device that outputs a video of the built-in video recording device through robot arm control. The processor 140 may select a GUI test scenario depending on an initial user setting, may store it in the storage 120, and may automatically repeat it.

The processor 140 may generate virtual touch coordinate information and transmit it to the built-in video recording device to automatically evaluate a GUI video transferred by the built-in video recording device.

The processor 140 may automatically determine suitability of a video by branching the video transmitted by the built-in video recording device to the vehicle display device.

The processor 140 may verify a booting time from a power-off state of the built-in video recording device to a point of time when a recording operation is possible when power is applied under at least one voltage condition. In this case, the at least at least one voltage condition may be set by a combination of parking recording setting, parking recording non-setting, and remote starting condition, and a detailed description thereof will be described later with reference to FIG. 8.

The processor 140 may automatically evaluate a deviation between a video of the front camera and a video of the rear camera for each of a plurality of recording modes. The recording modes may include at least one of a regular driving mode, a driving impact mode, a driving manual mode, a regular parking mode, a parking impact mode, or a parking manual recording mode, which will be described in detail later with reference to FIG. 9.

The processor 140 may evaluate whether a video stored in the built-in video recording device is automatically downloaded, and may determine suitability of an automatically generated log text file.

The processor 140 may verify suitability of a maximum capacity by extracting capacity information of a recorded video after performing recording at a maximum capacity for each of the recording modes.

The processor 140 may perform frame per second (FPS) verification by playing each recorded file after recording all videos for each of the recording modes in a full memory.

The processor 140 may output a license plate to the display panel to gradually reduce a size from an actual criterion size of the license plate, and may estimate a distance to an actual vehicle, to automatically verify license plate visibility for each estimated distance between the illuminance and the actual vehicle.

The processor 140 automatically determines whether the built-in video recording device performs normal recording under an abnormal power condition in conjunction with the power supply 180.

The processor 140 may automatically extract a recorded file list and automatically determine whether the file is appropriate and whether a file magnitude and a file name are appropriate based on meta data.

The manual recording button 150 allows a user to manually input a recording command of the built-in cam.

The vibration application button 160 allows the user to manually apply an impact to the built-in cam. Accordingly, the automatic evaluation apparatus 100 may verify a recording function upon impact, and may preset impact strength and impact level.

The gear button 170 makes it possible to manually determine a shift stage of the vehicle.

The power supply 180 supplies power to the built-in video recording device.

The GUI evaluation chamber 200 is a chamber for GUI screen evaluation.

FIG. 2A and FIG. 2B illustrate examples of a chamber configuration for GUI evaluation according to an exemplary embodiment of the present disclosure.

Referring to FIG. 2A, the GUI evaluation chamber 200 may include a robot arm 210, a vehicle device sample 201, a vibrator 280, and an ammeter 290.

The vehicle device sample 201 may include a vehicle display device 220 (e.g., an AVN), a built-in video recording device 230, an auxiliary battery 240, an amplifier 250, an Ethernet switch unit (ESU) or an integrated central control unit (ICU) 260, and a parking control device 270, they are the same samples as actual devices mounted in the vehicle, and detailed functional descriptions thereof will be omitted.

The vibrator 280 may apply a vibration to the built-in video recording device 230 depending on a command by the automatic evaluating apparatus 100. The ammeter 290 transmits a current applied from the power supply 180 to the built-in video recording device 230 depending on a command from the automatic evaluating apparatus 100.

The automatic evaluating apparatus 100 may include devices actually mounted in the vehicle as samples, and may perform verification using the samples. In this cases, the samples may include the built-in video recording device 230 (built-in cam), a front camera, a rear camera (ADAS_PRK commonly used), the auxiliary battery 240, the vehicle display device 200 (audio video navigation terminal (AVNT) panel), an AVNT keyboard, a center control panel (CCP), the amplifier (AMP) 250, a speaker, a parking control unit 2780 (e.g., ADAS_PRK controller), a communication gateway (router) controller, and the like.

The robot arm 210 may be controlled manually as well as being automatically evaluated, and a camera may be mounted on an upper end of the robot arm 210, and a touch position may be specified with the mounted camera. In addition, the automatic evaluating apparatus 100 may simultaneously check an overall control state inside the GUI evaluation chamber by using the camera of the robot arm 210.

Conventionally, a user directly input commands such as touch, zoom in, zoom out, etc. on the AVN display device 220, but as illustrated in FIG. 2B, in the present disclosure, a screen may be enlarged or reduced by touching the AVN display device 220 by using two conductive tips 231 and 232 of the robot arm 210.

The processor 140 spreads or narrows the two tips 211 and 212 to input commands such as zoom in and zoom out in a state where the two conductive tips 231 and 212 of the robot arm 210 are in contact with the AVN display device 220.

FIG. 3A and FIG. 3B illustrate examples of a chamber configuration for camera video evaluation according to an exemplary embodiment of the present disclosure.

A front camera chamber 300 is configured to evaluate the performance of the front camera.

Referring to FIG. 3A, the front camera chamber includes a front camera 303 and monitors 301 and 302. The monitor 302 displays video data of the front camera received from the vehicle, and the front camera 303 captures a video that is outputted to the monitor 302. In this case, the front camera 303 is a sample of the front camera that is actually mounted in the vehicle together with the vehicle video recording device, and the sample may be implemented as a same product as the front camera mounted in the vehicle. The monitor 301 branches an output video of the monitor 302 so that the output video of the monitor 302 can be checked outside the chamber.

A rear camera chamber 400 is configured to evaluate the performance of the rear camera.

Referring to FIG. 3B, the rear camera chamber 400 includes a rear camera 313 and monitors 311 and 312. The monitor 312 displays video data of the rear camera received from the vehicle, and the rear camera 313 captures a video that is outputted to the monitor 312. In this case, the rear camera 313 is a sample of the rear camera that is actually mounted in the vehicle together with the vehicle video recording device, and the sample may be implemented as a same product as the rear camera mounted in the vehicle. The monitor 311 branches an output video of the monitor 312 so that the output video of the monitor 312 can be checked outside the chamber.

FIG. 4A and FIG. 4B illustrate examples of a control table configuration according to an exemplary embodiment of the present disclosure.

Referring to FIG. 4A, an evaluation status board 401 displays an evaluation process and results.

Referring to FIG. 4B, the automatic evaluating apparatus 100 is implemented in the form of a personal computer in the control table 402, and a manual record button 150, a vibration application button 160, and a gear button 170 may be mounted. In addition, AVN/CCP samples for manual input may be mounted in the control table 402.

That is, a manual manipulation device may be manufactured as a separate product and mounted in the control table to enable manual manipulation of the built-in video recording device and manipulation of a LED indicator.

As such, the present disclosure discloses an example of recording and verifying the video output from the display panel by each camera (front/rear), but it is possible to verify video recording by inputting virtual video data (RGB) to a camera receiving end.

In addition, evaluation is possible even when there is no sample of the vehicle display device (AVNT), but it can be implemented as a separate AVNT simulator so that a screen can be outputted when a display simulator that can replace an AVNT product is developed to be connected to a built-in cam. In this case, since the separate AVNT is portable, it can be used not only in the evaluation but also in the actual vehicle.

Figure 5A:
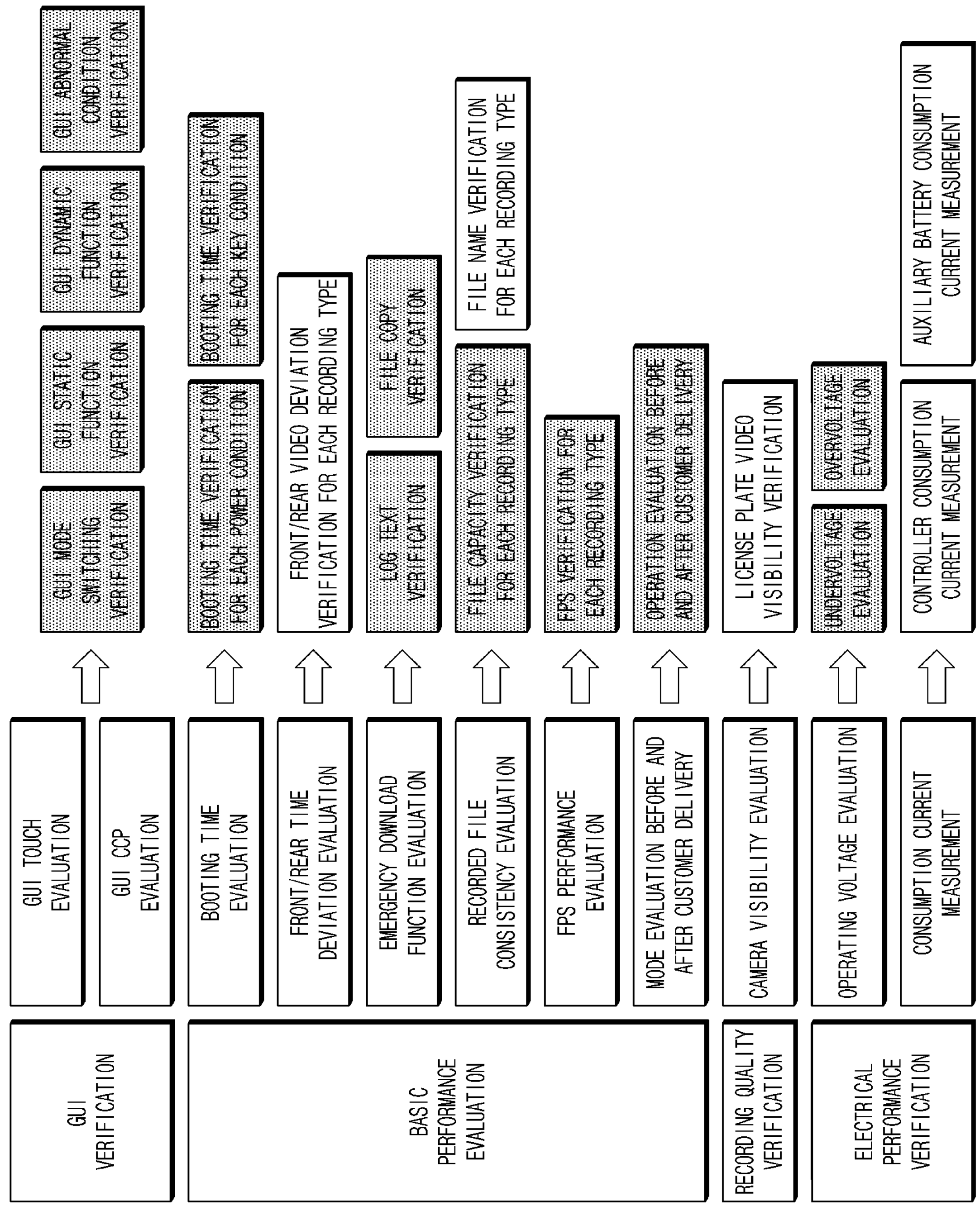
FIG. 5A and FIG. 5B illustrate examples of automatic evaluation items of a built-in video recording device according to an exemplary embodiment of the present disclosure.
Figure 5B:
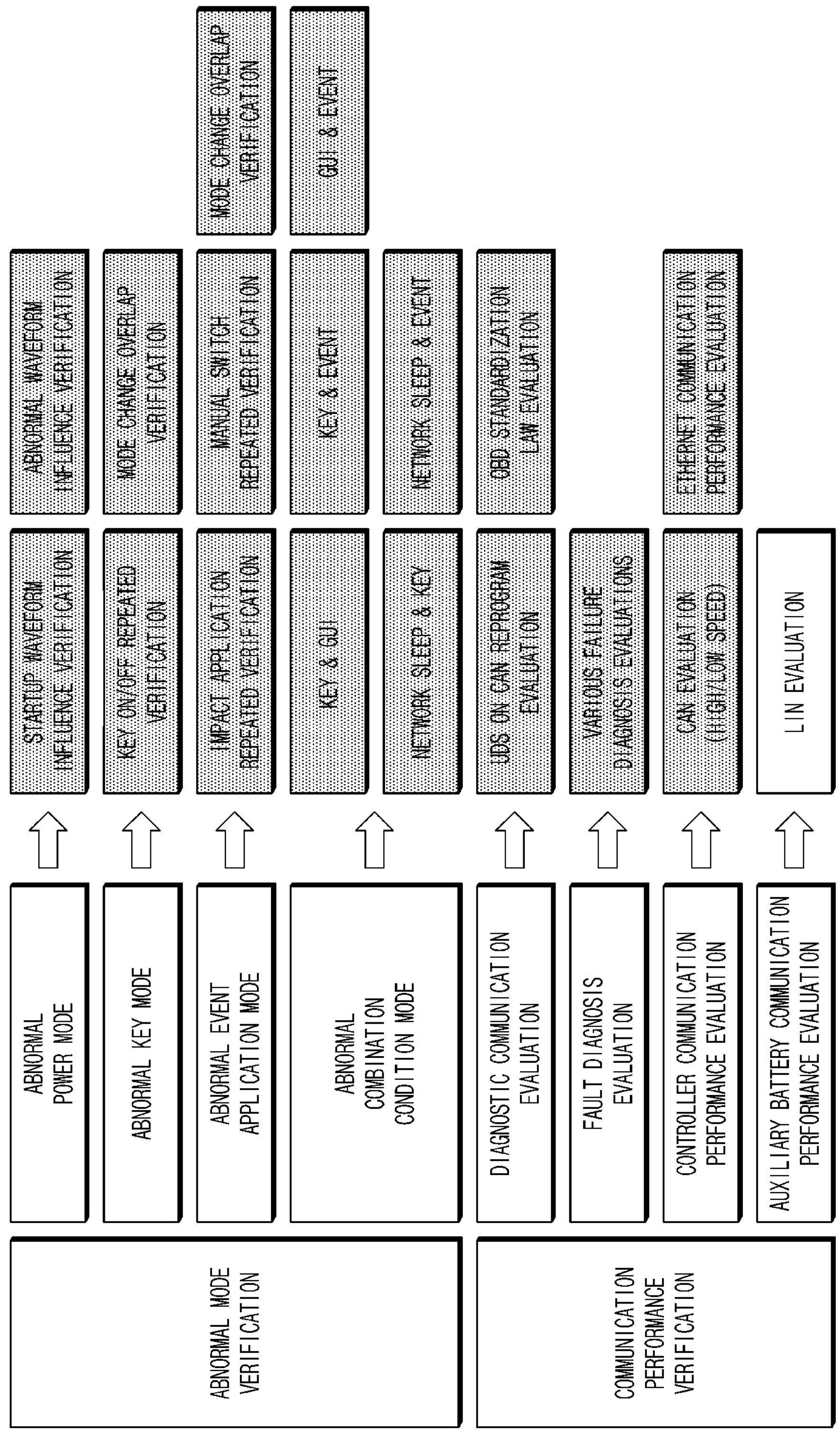

FIG. 5A and FIG. 5B illustrate examples of automatic evaluation items of a built-in video recording device according to an exemplary embodiment of the present disclosure.

Referring to FIG. 5A and FIG. 5B, the automatic evaluating apparatus 100 may perform GUI verification, basic performance verification, recording quality verification, electrical performance verification, abnormal mode verification, communication performance verification, etc. of the built-in video recording device.

The automatic evaluating apparatus 100 may perform evaluation items such as GUI touch evaluation and GUI center control panel (CCP) evaluation for GUI verification. In addition, the GUI touch evaluation item may include detailed evaluation items such as GUI mode switching verification, GUI static function verification, GUI dynamic function verification, GUI abnormal condition verification, and the like.

The static verification function is a test item that verifies the fixed video frame in the built-in cam GUI, and the dynamic verification item is a test item that determines whether to scroll a video list or play a video based on a vision technique. The GUI mode conversion verification is a test item that checks an ability to switch panel control between the AVNT and the built-in cams, and is a test item to check whether control authority is normally transferred to the built-in cam through signal handshaking between the AVNT and the built-in cam through Ethernet or CAN communication when a built-in cam icon in an AVNT menu is touched. The abnormal test condition is a test item that verifies whether a normal screen is outputted under various abnormal touch conditions by additionally setting control such as touch interval and simultaneous touch through touch coordinates or robot arm by a tester, and implements software to automate the above four GUI verification methods.

The automatic evaluating apparatus 100 performs evaluation items such as booting time evaluation, front/rear time deviation evaluation, emergency download function evaluation, recorded file consistency evaluation, FPS performance evaluation, and mode evaluation before and after customer delivery, for the basic performance evaluation.

The booting time evaluation item may include detailed evaluation items such as booting time verification for each power condition and booting time verification for each key condition.

A booting time indicates a time from a power-off state of the built-in cam to a point of time when a recording operation is possible when power is applied. In this case, when recording is performed, an interior operation LED indicator of the front camera or the built-in cam lights up, and the automatic evaluating apparatus 100 utilizes this point to monitor a power-off state of the built-in cam (IG OFF && Communication Sleep), and automatically measures a time until the LED indicator turns on after applying an ACC/IG power. In addition, the automatic evaluating apparatus 100 may measure and automatically record the time from a time of power application to a time of power application of the built-in cam LED indicator, and may evaluate this by measuring the time from the time when power is applied to the time when power is applied to the built-in cam LED indicator under various voltage conditions.

The front/rear time deviation evaluation items may include detailed evaluation items such as front/rear video deviation verification for each recording type.

To verify the front/rear time deviation, the automatic evaluating apparatus 100 may output a timer that is synchronized to a monitor (display panel) in the camera chamber and control the built-in cam to record it, and may automatically extract a recorded file and obtain the difference between timer time values displayed on the front/rear video after playback to obtain information related to a deviation of the front/rear recording time.

In addition, the automatic evaluating apparatus 100 may measure the front/rear video deviation for each recording mode in order to verify a front/rear video recording deviation, and may automatically perform regular driving, driving impact, driving manual, regular parking, parking impact, and parking manual recording modes to measure the front/rear video deviation for each mode. Particularly, the automatic evaluating apparatus 100 may apply an impact to a G-sensor in the built-in cam using a vibration motor for impact recording, and may perform the impact recording by applying vibrations when an impact condition is required during automatic evaluation. In this case, the vibration motor may be mounted in a mounting portion of the in-vehicle video recording device 230 in the GUI evaluation chamber 200.

The emergency download function evaluation item may include detailed evaluation items such as log text verification and file copy verification.

Emergency download, which is a function that extracts all videos stored by the built-in cam alone at a service center when the AVNT is damaged after a vehicle accident, is a function that automatically downloads all videos to an USB connected to the built-in cam when a specific power (e.g., B+/IGN/GND, etc.) is applied. Since the automatic evaluating apparatus 100 can control all PINS of the built-in cam, it may automatically determine whether all recorded files have been copied normally by applying power that satisfies a condition to the built-in cam and monitoring whether files are automatically copied to the USB. In this case, a recorded file of a built-in cam dedicated USB can be automatically copied to the automatic evaluating apparatus 100.

As such, the automatic evaluation apparatus 100 may determine whether all recorded files are normally copied, may verify text suitability of a log text file automatically generated during emergency download, and may determine whether emergency download is normally performed.

The recording file consistency evaluation item may include detailed evaluation items such as file capacity verification for each recording type and file name verification for each recording type. In the case of file capacity suitability, it is an item that automatically determines whether the specification for the maximum capacity defined for each recording mode (regular driving/driving impact/driving manual/regular parking/parking impact/parking manual/time-lapse) is satisfied. The automatic evaluating apparatus 100 may automatically extract only capacity information of a recorded video by automatically copying the file after performing recording with a maximum capacity for each recording mode, may filter the maximum capacity among them, and automatically compare and verify that this maximum capacity meets a specification. In addition, the automatic evaluating apparatus 100 may automatically verify whether the recorded file satisfies a prescribed file name.

The frame per second (FPS) performance evaluation may include detailed evaluation items such as FPS verification for each recording type.

A FPS verification technique for each recording type is a new verification item that was not performed during actual vehicle verification. The automatic evaluating apparatus 100 may record all videos for each recording mode in a full memory, and then may play each recorded file and extract the number of frames per second in real time, and may finally record Max FPS, Min FPS and Avg FPS values automatically.

The automatic evaluating apparatus 100 may automatically calculate how much the Max FPS, Min FPS, and Avg FPS values exceed or dissatisfy a FPS criterion for each recording mode defined in the specification, and may automatically determine that it is a failure when it is less than the set criterion (tolerance).

The mode evaluation item before and after customer delivery may include detailed evaluation items such as operation evaluation before and after customer delivery.

The automatic evaluating apparatus 100 may perform a camera visibility evaluation item to verify recording quality. The camera visibility evaluation item may include detailed evaluation items such as license plate video visibility verification.

For license plate visibility verification, the automatic evaluating apparatus 100 may output the license plate to the front/rear camera chamber on the display panel, may gradually reduce a size from an actual size of the license plate, and may evaluate it by estimating a distance to the actual vehicle. The automatic evaluating apparatus 100 may be provided with a illuminance control function on the display panel (monitor) itself of the front/rear camera chamber, and may automatically adjust brightness and may automatically verify license plate visibility by various an illuminance condition and estimated distance from the actual vehicle.

The automatic evaluating apparatus 100 may perform evaluation items such as operating voltage evaluation and consumption current measurement to verify electrical performance.

The operating voltage evaluation item may include detailed evaluation items such as undervoltage evaluation and overvoltage evaluation. In this case, the consumption current measurement item may include detailed evaluation items such as controller consumption current measurement and auxiliary battery consumption current measurement.

The automatic evaluation apparatus 100 may perform evaluation items such as an abnormal power mode, an abnormal key mode, an abnormal event application mode, and an abnormal combination condition mode for abnormal mode verification.

The abnormal power mode may include detailed evaluation items such as verification of a startup waveform influence and an abnormal waveform influence.

When verifying the abnormal power mode, the automatic evaluating apparatus 100 may perform evaluation after presetting various abnormal power conditions in a graph form using the power supply 180. The automatic evaluating apparatus 100 may apply a waveform such as a vehicle startup waveform or instantaneous power drop to the built-in cam during an operation of the built-in cam to determine whether recording is normally performed and whether there is a malfunction. In this case, the automatic evaluating apparatus 100 may automatically determine whether recording is normally performed using whether an LED indicator is lit during recording and whether a built-in cam GUI menu is normally outputted. In addition, the automatic evaluating apparatus 100 may periodically transmit a fault diagnosis request (Tx) message to the built-in cam through a communication line of the built-in cam, and when a fault code response occurs, may record it and automatically determine whether there is a fault.

The abnormal key mode may include detailed evaluation items such as key on/off repeated verification and mode change overlap verification.

The abnormal event application mode may include detailed evaluation items such as impact application repeated verification, manual switch repeated verification, and mode change overlap verification.

The abnormal combination condition mode may include detailed evaluation items such as key and GUI, key and event, GUI and event, network sleep and key, and network sleep and event.

For the abnormal combination condition mode verification, the automatic evaluation device 100 may automatically verify whether the built-in cam malfunctions under various abnormal conditions by combining a built-in cam power condition (B+/ACC/IG1), a GUI touch condition, and an impact application condition, The automatic evaluating apparatus 100 may determine whether it is normal by automatically measuring an LED indicator, a GUI menu normal output, a fault code occurrence, etc. after each of the abnormal conditions is applied, similarly to the power malicious mode verification.

The automatic evaluating apparatus 100 may perform evaluation items such as diagnostic communication evaluation, fault diagnosis evaluation, controller communication performance evaluation, and auxiliary battery communication performance evaluation for communication performance verification.

The diagnostic communication evaluation may include detailed evaluation items such as UDS on CAN reprogram evaluation and OBD standardization law evaluation.

The failure diagnosis evaluation may include detailed evaluation items such as various failure diagnosis evaluations. The controller communication performance evaluation may include detailed evaluation items such as CAN evaluation (high/low speed) and Ethernet communication performance evaluation. The auxiliary battery communication performance evaluation may include detailed evaluation items such as LIN evaluation.

Hereinafter, an automatic evaluating method of a built-in video recording device will be described with reference to FIG. 6 to FIG. 9.

Figure 6:
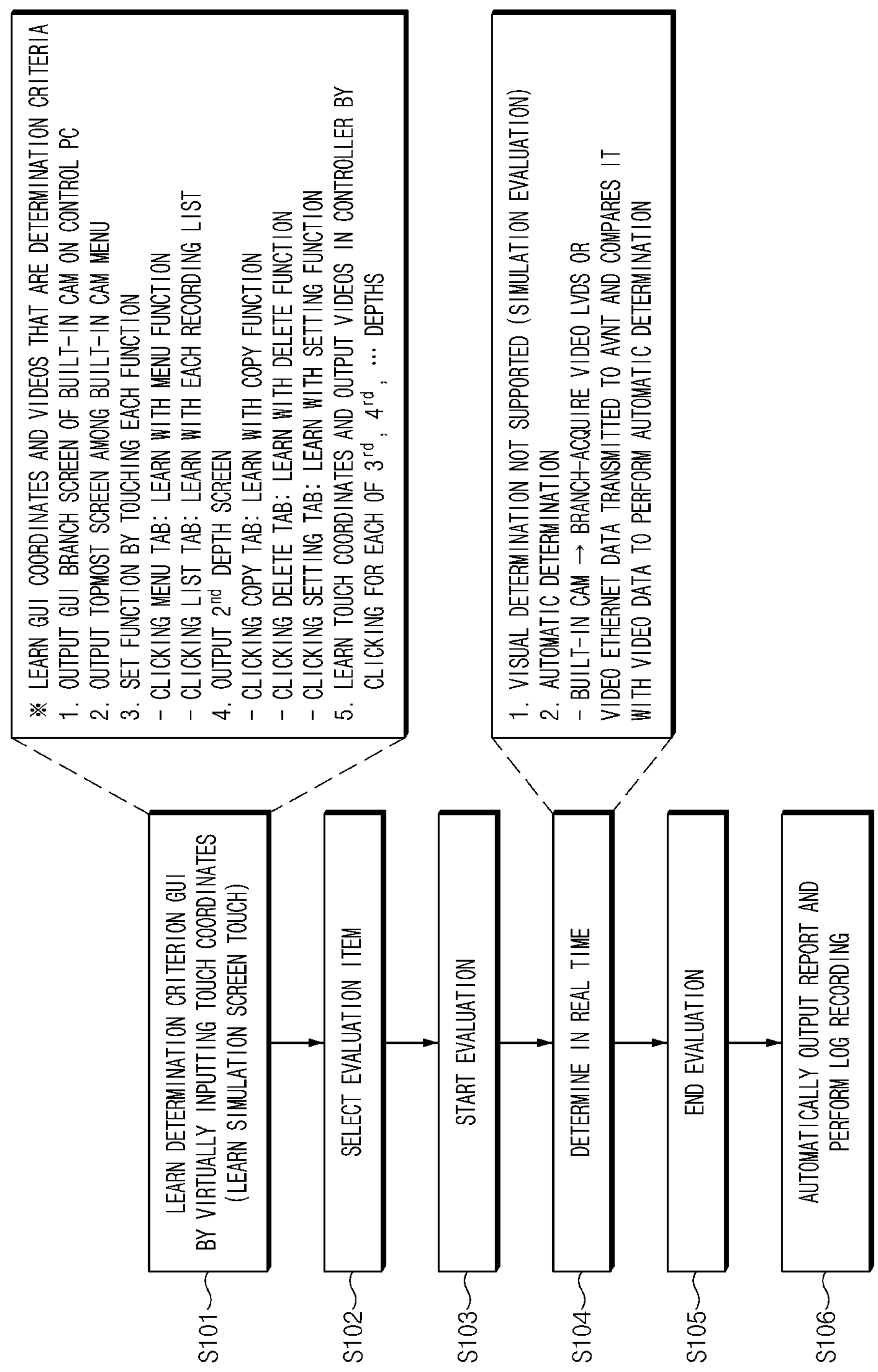
FIG. 6 illustrates a flowchart showing a GUI evaluating method using virtual touch coordinates according to an exemplary embodiment of the present disclosure.
Figure 7:
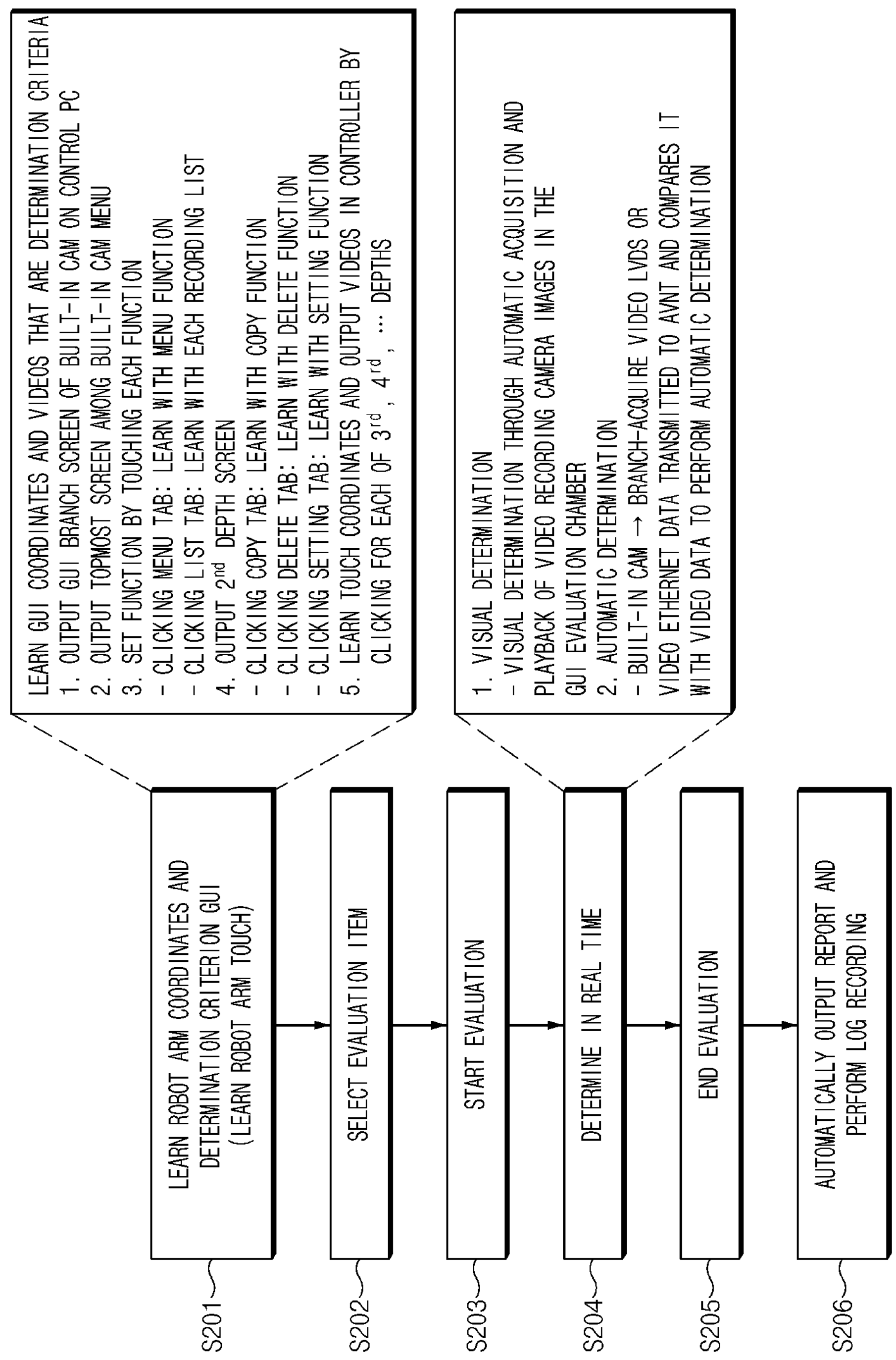
FIG. 7 illustrates a flowchart showing a GUI evaluating method using a robot arm according to an exemplary embodiment of the present disclosure.
Figure 8:
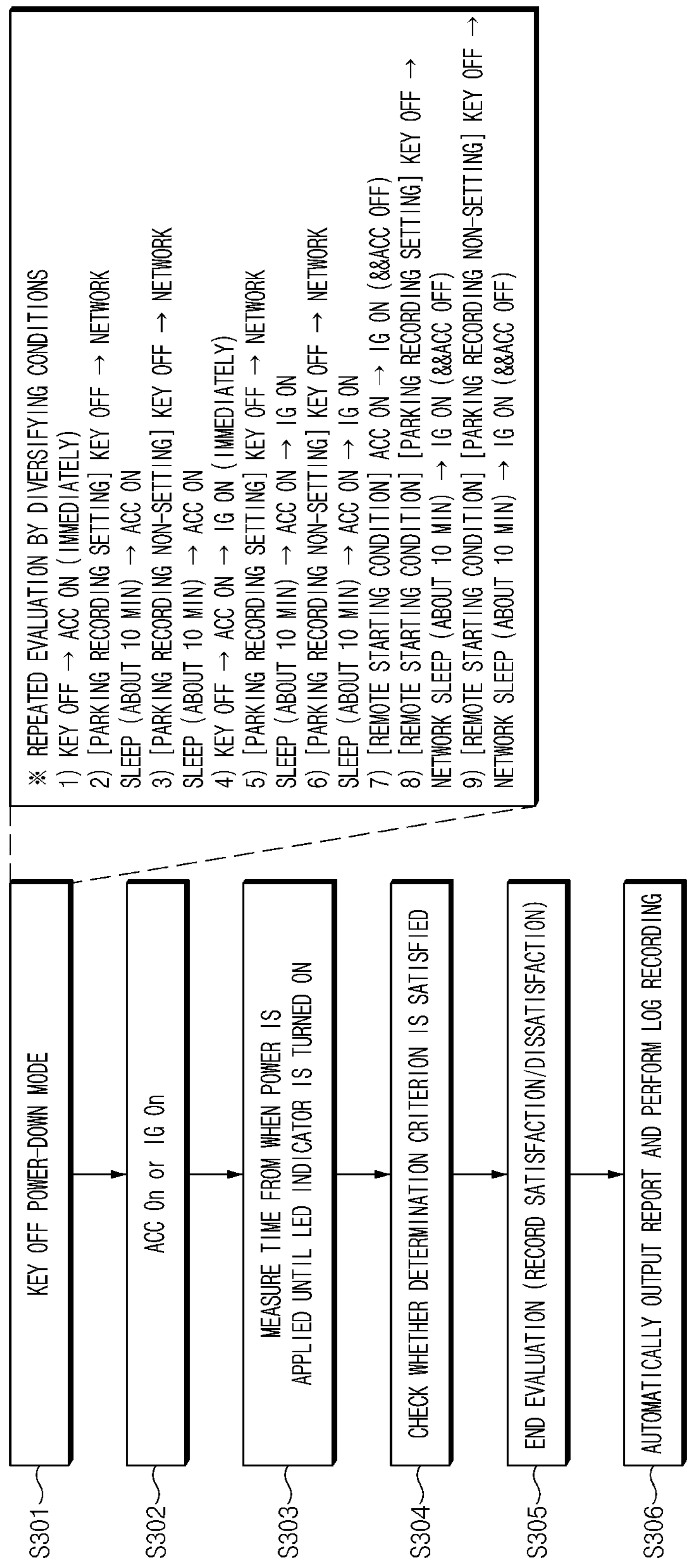
FIG. 8 illustrates a flowchart showing a method for automatically verifying a booting time according to an exemplary embodiment of the present disclosure.
Figure 9:
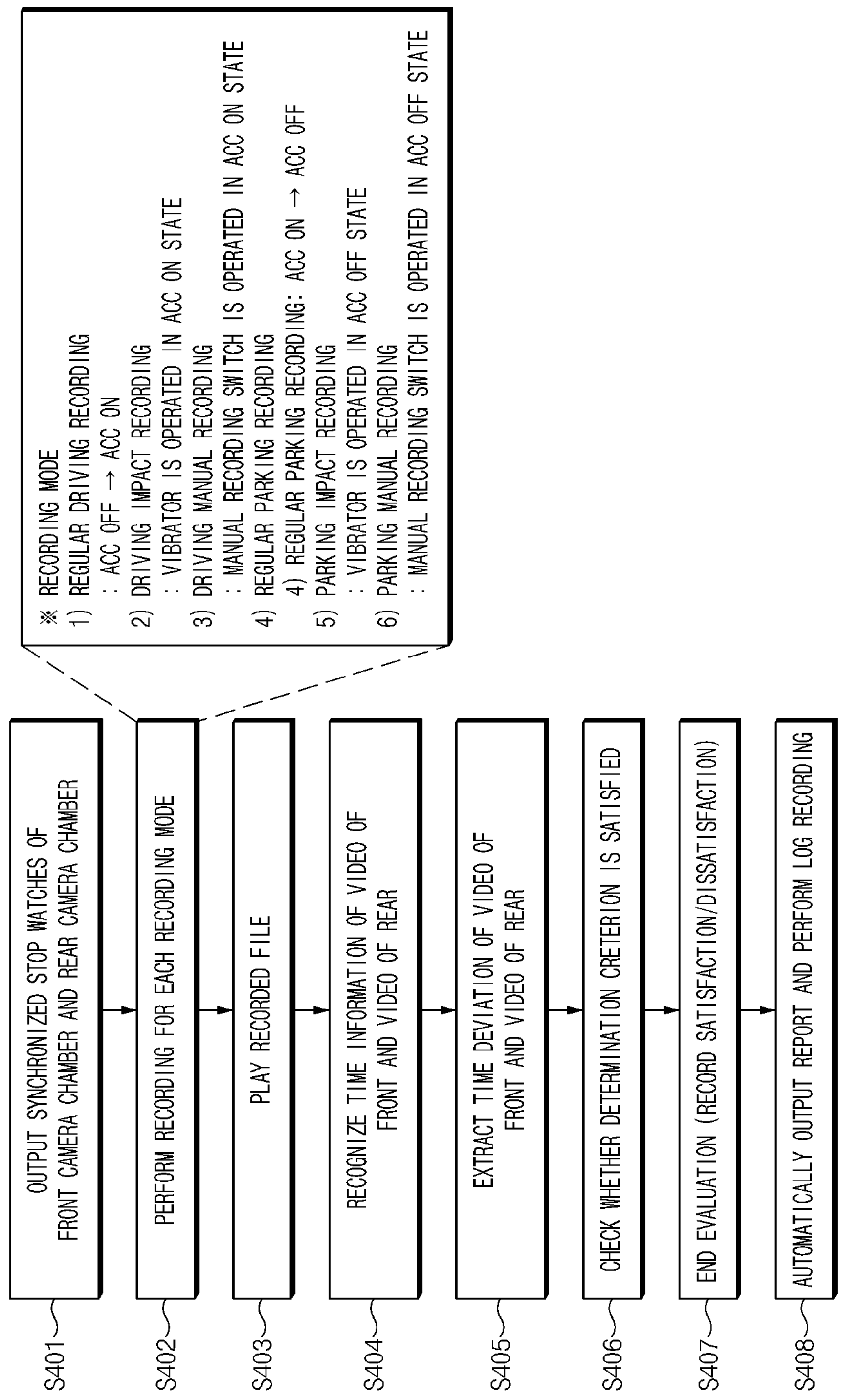
FIG. 9 illustrates a flowchart showing a method for automatically evaluating front/rear video deviation according to an exemplary embodiment of the present disclosure.

FIG. 6 illustrates a flowchart showing a GUI evaluating method using virtual touch coordinates according to an exemplary embodiment of the present disclosure, and FIG. 7 illustrates a flowchart showing a GUI evaluating method using a robot arm according to an exemplary embodiment of the present disclosure. FIG. 8 illustrates a flowchart showing a method for automatically verifying a booting time according to an exemplary embodiment of the present disclosure, and FIG. 9 illustrates a flowchart showing a method for automatically evaluating front/rear video deviation according to an exemplary embodiment of the present disclosure.

Hereinafter, it is assumed that the automatic evaluating apparatus 100 of FIG. 1 performs the processes of FIG. 6 to FIG. 9. In addition, in the description of FIG. 6 to FIG. 9, operations described as being performed by the device may be understood as being controlled by the processor 140 of the automatic evaluating apparatus 100.

Hereinafter, a lane GUI evaluation method according to an exemplary embodiment of the present disclosure will be described in detail with reference to FIG. 6 and FIG. 7.

A GUI touch automatic evaluation technique may be classified into two main methods. A first one thereof is a technique to virtually transmit touch coordinate information to the built-in cam controller to determine the transmitted GUI video when there is no AVNT sample as illustrated in FIG. 6. A second one thereof is a technique to determine a video by directly touching a AVNT panel with a robot arm by mounting an AVNT sample as illustrated in FIG. 7.

First, in FIG. 6, when there is no AVNT sample, a method of performing automatic simulation evaluation by inputting virtual touch coordinates instead of robot arm control is disclosed.

The automatic evaluating apparatus 100 may learn GUI coordinates and videos that are determination criteria by virtually inputting touch coordinates (S101). That is, the automatic evaluating apparatus 100 does not have an AVNT sample and a robot arm, but learns and stores coordinate information and a video executed by the touch in advance when the robot arm actually touches the AVNT. Since the GUI specification transmitted by the built-in cam, which is the built-in video recording device, differ for each AVNT specification, it implements a function of acquiring and learning a video that is a determination criterion based on a AVNT platform.

That is, the automatic evaluating apparatus 100 may learn in advance GUI coordinates and videos, which are determination criteria for automatic evaluation of the built-in video recording device.

The automatic evaluation apparatus 100 outputs a GUI branch screen of the built-in video recording device (built-in cam), and outputs a topmost screen among the built-in cam menus. Next, it sets a function by touching each function tab in the topmost screen, learns and stores coordinate information related to the function. Specifically, when a user clicks a menu tab and a recording list tab on the AVN screen, coordinate information and a video to be executed may be learned and stored as a determination reference video.

In addition, the automatic evaluating apparatus 100 may output a detailed screen when a menu tab or a recording list tab is clicked, may learn and save coordinate information by clicking a detailed menu tab (e.g., a copy tab, a delete tab, or a setting tab) on a detailed screen, and may output a more detailed menu when each detailed menu tab is clicked. It is possible to enter the GUI such as $1^{st}$ Depth, $2^{nd}$ Depth, $3^{rd}$ Depth from a GUI main menu through touch automation for each test item, and it makes it possible to return to Default Depth (main menu) when an independent test is performed.

As described above, the automatic evaluating apparatus 100 may learn and store in advance coordinate information and a determination reference video when the menu tab is touched by a user. As in S101, learning may be performed in advance.

The automatic evaluating apparatus 100 selects an evaluation item of the built-in video recording device as illustrated in FIG. 5A and FIG. 5B for evaluation, and starts evaluation (S103).

Then, the automatic evaluating apparatus 100 may determine the evaluation in real time (S104).

In this case, the automatic evaluating apparatus 100 may compare a video transmitted from the built-in video recording device (built-in cam) to the vehicle display device (AVNT) the determination criterion video data to automatically determine whether the corresponding video data is normal. In this case, the automatic evaluating apparatus 100 may branch-acquire low voltage differential signaling (LVDS) communication or Ethernet communication data and compare it with determination reference video data to perform automatic determination In addition, the automatic evaluating apparatus 100 may output the branch-acquired LVDS communication or Ethernet communication data to a situation monitor so that a user can visually determine whether it is normal.

The automatic evaluating apparatus 100 ends the evaluation after automatic determination (S105), automatically outputs a report on the evaluation, and performs log recording (S106).

First, FIG. 7 discloses a method of performing evaluation by touching an AVNT screen through robot arm control when there is an AVNT sample.

The automatic evaluating apparatus 100 may learn coordinates of a position touched by the robot arm and the video used as the determination criterion (S201). That is, the automatic evaluating apparatus 100 may control the robot arm to touch the AVNT sample, and when the robot arm touches the AVNT sample, may learn and store coordinate information and videos executed by touch in advance, this learning process is the same as that described with reference to FIG. 6, and thus a detailed description thereof will be omitted.

As described above, the automatic evaluating apparatus 100 may learn and store in advance coordinate information and a determination reference video when the menu tab is touched by a user. As in S101, learning may be performed in advance.

The automatic evaluating apparatus 100 selects an evaluation item of the built-in video recording device as illustrated in FIG. 5A and FIG. 5B for evaluation, and starts evaluation (S203).

Then, the automatic evaluating apparatus 100 may determine the evaluation in real time (S204).

In this case, the automatic evaluating apparatus 100 may compare a video transmitted from the built-in video recording device (built-in cam) to the vehicle display device (AVNT) the determination criterion video data to automatically determine whether the corresponding video data is normal. In this case, the automatic evaluating apparatus 100 may branch-acquire low voltage differential signaling (LVDS) communication or Ethernet communication data and compare it with determination reference video data to perform automatic determination In addition, the automatic evaluating apparatus 100 may output the branch-acquired LVDS communication or Ethernet communication data to a situation monitor so that a user can visually determine whether it is normal.

The automatic evaluating apparatus 100 ends the evaluation after automatic determination (S205), automatically outputs a report on the evaluation, and performs log recording (S206).

The built-in cam transmits a setting GUI and playback GUI to the AVNT panel using LVDS communication or Ethernet communication. Accordingly, the automatic evaluating apparatus 100 may branch a video communication line between the AVNT and the built-in cam to branch and output the video transmitted from the built-in cam to the AVNT to the display unit 130 of the automatic evaluation device 100.

Therefore, when performing initial test scenario and a determination screen learning process through a screen of the branched video, a user may learn a test sequence such that the test proceeds in an order in which the displayed GUI touch is touched with a mouse, and may store screen information that is outputted every time it is touched to implement it to be used as a comparison determination screen during actual automatic evaluation.

First, for each GUI platform specification, a tester captures and learns the test scenario and a determination criterion screen once, and then automatic evaluation is possible between the AVNT and the built-in cam of a same platform.

After scenario learning, it is possible to perform evaluation by separating a case (FIG. 7) that the aforementioned AVNT sample exists and a case (FIG. 6) that no AVNT sample exists. Accordingly, when the AVNT sample and the robot arm exist (FIG. 7), the automatic evaluating apparatus 100 may automatically determine whether or not it is a valid GUI output or not through GUI data that the robot arm directly touches the AVNT screen according to the scenario and branches at the same time. As illustrated in FIG. 2A, touch tips 211 and 212 of the robot arm include two tips, and it is possible to evaluate an enlargement/reduction function of a playback screen in a same way as control through human fingers by adding enlarging/reducing control function to the tips. In addition, since the robot arm is equipped with a high-performance camera, the video outputted from the AVNT panel can be compared with the GUI transmitted from the built-in cam.

When there is no AVNT sample, the automatic evaluating apparatus 100 may automatically input virtual touch coordinate information to the built-in cam through LVDS or Ethernet communication to determine a screen based on GUI information outputted from the built-in cam.

As such, when there is no AVNT sample, built-in cam GUI software is independently verified, and when there is an AVNT sample, the built-in cam GUI software and the AVNT software can be compared and verified at the same time.

Hereinafter, a booting time automating verification method according to an exemplary embodiment of the present disclosure will be described with reference to FIG. 8.

Referring to FIG. 8, after power such as ACC On or IG On is applied in a key off power down mode (S301), the automatic evaluating apparatus 100 measures a time from when the power is applied until a LED indicator is turned on (S303).

In this case, the automatic evaluating apparatus 100 may change various power conditions in a process of applying power (S302).

For example, 1) Key Off→ACC On (immediately), 2) [parking recording setting] Key Off→network sleep (about 10 minutes)→ACC On, 3) [no parking recording] Key Off→network sleep (about 10 minutes)→ACC On, 4) Key Off→ACC On→IG On (immediate), 5) [parking recording setting] Key Off→network sleep (about 10 minutes)→ACC On→IG On, 6) [parking recording not set] Key Off→network sleep (about 10 minutes)→ACC On→IG On, 7) [remote start condition] Key Off→IG On (&&ACC Off), 8) [remote start condition] [parking recording setting] Key Off→network sleep (about 10 minutes)→IG On (&&ACC Off), 9) [remote start condition] [parking recording not set] Key Off→network sleep (about 10 minutes)→ IG On (&&ACC Off).

Next, the automatic evaluating apparatus 100 determines whether the measured time from the power application time until the LED indicator is turned on satisfies a predetermined criterion (S304), ends the evaluation, and records an evaluation result (S305).

Then, the automatic evaluating apparatus 100 automatically outputs a report on the evaluation result and records a log (S306).

That is, when recording of the built-in cam is performed, an interior operation LED indicator of the front camera or the built-in cam lights up, and thus the automatic evaluating apparatus 100 measures a time from a time when power is applied to the built-in cam to a time when the indicator is turned on, and calculates a booting time and determines whether the booting time is normal by checking whether the booting time satisfies a predetermined criterion.

Hereinafter, an automatic front/rear video deviation evaluation method according to an exemplary embodiment of the present disclosure will be described in detail with reference to FIG. 9.

Referring to FIG. 9, the automatic evaluating apparatus 100 outputs synchronized stop watches of the front camera chamber and the rear camera chamber (S401).

Then, the automatic evaluating apparatus 100 performs recording for each recording mode using each camera of the front camera chamber and the rear camera chamber (S402), and plays a recorded file through a monitor of each chamber (S403).

In this case, each recording mode include, e.g., 1) a regular driving recording mode: ACC Off→ACC On, 2) a driving impact recording mode: vibrator works in an ACC On state, 3) a driving manual recording mode: an manual recording switch operation in an ACC On state; 4) a regular parking recording mode: ACC On→ACC Off, 5) a parking shock recording mode: vibrator works in an ACC Off state, and 6) a parking manual recording mode: a manual recording switch operation in an ACC Off state.

Then, the automatic evaluating apparatus 100 recognizes time information of a video of a front camera and a video of a rear camera (S404), and extracts a time difference between the video of the front camera and the video of the rear camera (S405).

As such, the automatic evaluating apparatus 100 outputs a timer synchronized to the display panel in the camera chamber, controls the built-in cam to record it, automatically extracts the recorded file and plays it back, and then displays a timer time value difference to verify a deviation of the front/rear recording time. In addition, the automatic evaluating apparatus 100 may be implemented to perform measurement for each recording mode, and may measure the front/rear video deviation for each mode by automatically performing regular driving, driving impact, driving manual, regular parking, parking impact, and parking manual recording modes.

Thereafter, the automatic evaluating apparatus 100 determines whether the extracted front/rear video time deviation satisfies a predetermined determination criterion (S406), ends the evaluation and records an evaluation result (S407), and automatically outputs the evaluation result as a report and records a log (S408).

As such, according to the present disclosure, through development of a built-in cam system level automating evaluation device, GUI touch test may be quantified using robot arm control or automatic touch coordinate input software, and recording file full loading evaluation may be performed automatically. In addition, according to the present disclosure, various evaluations may be performed without time and space constraints by implementing quantitative test control for illuminance and license plate distance control, which was previously difficult to check under actual vehicle environmental conditions. In addition, the present disclosure can also be used for single item verification by partners who will develop our built-in cam system in the future, and can also be usefully used for local development in overseas technical research institutes.

Figure 10:
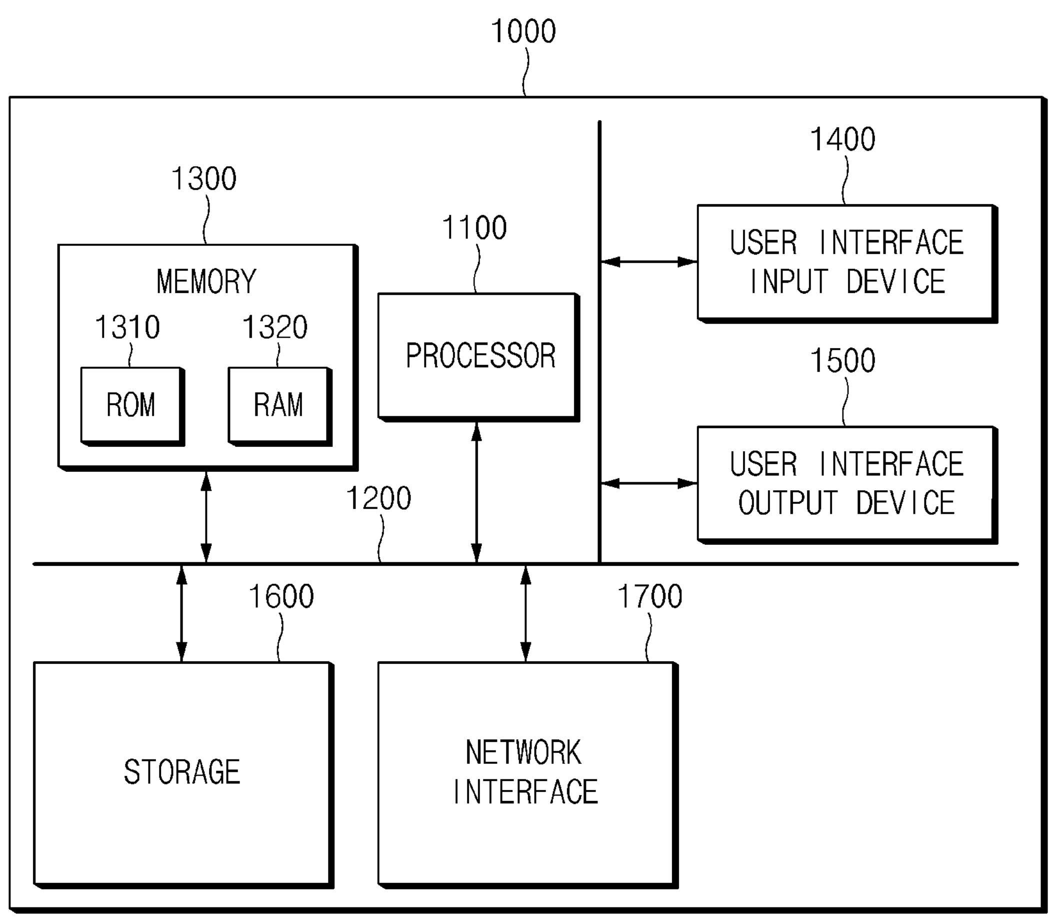
FIG. 10 illustrates a computing system according to an exemplary embodiment of the present disclosure.

FIG. 10 illustrates a computing system according to an exemplary embodiment of the present disclosure.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An automatic evaluating apparatus outside a vehicle comprising:

a processor configured to:

automatically evaluate performance of a built-in video recording device of a vehicle, interworking with a vehicle display device outside the vehicle for evaluate performance of the built-in video recording device; and automatically evaluate at least one of graphical user interface (GUI) verification, recording quality verification, electrical performance verification, abnormal mode verification, or communication performance verification of a video of the built-in video recording device; and a storage configured to store data and algorithms driven by the processor;

wherein the GUI verification includes a GUI abnormal condition verification performed by:

receiving touch control settings for a GUI screen of the vehicle display device that outputs a video of the build-in video recording device, the touch control settings including touch interval and simultaneous touch; and verifying whether a normal touch screen is output based on the received the touch control settings.

2. The automatic evaluating apparatus of claim 1, wherein the basic performance verification includes at least one of booting time evaluation, front and rear time deviation evaluation, emergency download function evaluation, recorded file consistency evaluation, frame per second (FPS) performance evaluation, or mode evaluation before and after customer delivery.

3. The automatic evaluating apparatus of claim 1, wherein the processor evaluates the GUI verification by automatically touching the GUI screen of the vehicle display device through robot arm control according to the received touch control settings.

4. The automatic evaluating apparatus of claim 1, wherein the processor evaluates the GUI verification by generating virtual touch coordinate information corresponding to the received touch control settings and transmitting it to the built-in video recording device to automatically evaluate a GUI video that is transferred by the built-in video recording device.

5. The automatic evaluating apparatus of claim 1, wherein the processor automatically determines suitability of a video that is transmitted by the built-in video recording device to the vehicle display device by branching the video.

6. The automatic evaluating apparatus of claim 1, wherein the processor verifies a booting time from a power-off state of the built-in video recording device to a point of time when a recording operation is possible when power is applied under at least one voltage condition.

7. The automatic evaluating apparatus of claim 6, wherein the at least one voltage condition is set by a combination of parking recording setting, parking recording non-setting, and remote starting condition.

8. The automatic evaluating apparatus of claim 1, wherein the processor automatically evaluates a deviation between a video of a front camera and a video of a rear camera for each of a plurality of recording modes.

9. The automatic evaluating apparatus of claim 8, wherein the recoding modes include at least one of a regular driving mode, a driving impact mode, a driving manual mode, a regular parking mode, a parking impact mode, or a parking manual recording mode.

10. The automatic evaluating apparatus of claim 1, wherein the processor evaluates whether a video stored in the built-in video recording device is automatically downloaded, and determines suitability of an automatically generated log text file.

11. The automatic evaluating apparatus of claim 1, wherein the processor verifies suitability of a maximum capacity by extracting capacity information of a recorded video after performing recording at the maximum capacity for each of a plurality of recording modes.

12. The automatic evaluating apparatus of claim 1, wherein the processor performs frame per second (FPS) verification by playing each recorded file after recording all videos for each of a plurality of recording modes in a full memory.

13. The automatic evaluating apparatus of claim 1, wherein the processor outputs a license plate to a display panel to gradually reduce a size from an actual criterion size of the license plate, and estimates a distance to an actual vehicle, to automatically verify license plate visibility for each estimated distance between illuminance and an actual vehicle.

14. The automatic evaluating apparatus of claim 12, wherein the processor automatically determines whether the built-in video recording device performs normal recording under an abnormal power condition in conjunction with a power supply.

15. The automatic evaluating apparatus of claim 1, wherein the processor automatically extracts a recorded file list and automatically determines whether the file is appropriate and whether a file capacity and a file name are appropriate based on meta data.

16. The automatic evaluating apparatus of claim 1 wherein the automatic evaluating apparatus connects with the vehicle display device and one or more of a front camera, a rear camera, and a parking, control device.

17. The automatic evaluating apparatus of claim 1 wherein the automatic evaluating apparatus connects with the vehicle display device and each of a front camera, a rear camera, and a parking control device.

18. A vehicle system comprising:

a) a vehicle; and b) an automatic evaluating apparatus outside the vehicle and comprising:

i) a vehicle display device positioned outside the vehicle to evaluate performance of a video recording device built-in the vehicle;

ii) a processor configured to:

automatically evaluate performance of the built-in video recording device of a vehicle interworking with the vehicle display device outside the vehicle to evaluate performance of the built-in video recording device;

automatically evaluate at least one of graphical use interface (GUI) verification, recording quality verification, electrical performance verification, abnormal mode verification, or communication performance verification of a video of the built-in video recording device; and iii) a storage configured to store data and algorithms driven by the processor;

wherein the GUI verification includes a GUI abnormal condition verification performed by:

receiving touch control settings for a GUI screen of the vehicle display device that outputs a video of the built-in video recording device, the touch control settings including touch interval and simultaneous touch; and verifying whether a normal touch screen is output based on the received the touch control settings.

* * * * *